(12) United States Patent
Courter

(10) Patent No.: US 10,024,620 B1
(45) Date of Patent: Jul. 17, 2018

(54) MULTI-DIRECTIONAL LOCKING GUN MOUNT AND METHODS OF USE FOR A VARIETY OF APPLICATIONS

(71) Applicant: ELIGIUS TECHNOLOGIES, LLC, Collierville, TX (US)

(72) Inventor: Seth Christian Courter, Collierville, TN (US)

( * ) Notice: Subject to any disclaimer, the term of this patent is extended or adjusted under 35 U.S.C. 154(b) by 0 days.

(21) Appl. No.: 15/791,896

(22) Filed: Oct. 24, 2017

(51) Int. Cl.
*F41A 23/26* (2006.01)
*F41A 23/34* (2006.01)
*F41A 23/50* (2006.01)

(52) U.S. Cl.
CPC .............. *F41A 23/26* (2013.01); *F41A 23/34* (2013.01); *F41A 23/50* (2013.01)

(58) Field of Classification Search
CPC ...... F41A 23/26; F41A 23/34; F41A 23/3423; F41A 23/00
USPC ......................... 89/37.02–37.22, 40.01–40.16
See application file for complete search history.

(56) References Cited

U.S. PATENT DOCUMENTS

| 3,266,633 | A | * | 8/1966 | Graebner | B60R 9/02 211/64 |
| 4,823,673 | A | * | 4/1989 | Downing | F41A 23/34 224/401 |
| 4,995,537 | A | * | 2/1991 | Thedieck | B60R 7/14 211/64 |
| 5,706,990 | A | * | 1/1998 | Lahrson | B60R 9/08 211/64 |
| 5,934,112 | A | * | 8/1999 | Rice | B60R 7/14 211/64 |
| 5,979,846 | A | * | 11/1999 | Fluhr | B60R 7/14 211/64 |
| 6,021,936 | A | * | 2/2000 | Savant | B60R 7/14 224/282 |
| 7,770,767 | B2 | * | 8/2010 | Bartholdy | B60R 7/14 224/282 |
| 8,322,068 | B2 | * | 12/2012 | Wilson | F41A 29/00 42/90 |
| 8,444,034 | B2 | * | 5/2013 | Bennett | F41A 23/18 211/64 |
| 8,651,289 | B2 | * | 2/2014 | Diaz, Jr. | A01K 97/08 206/315.1 |
| 8,905,282 | B2 | * | 12/2014 | Miller | B60R 7/14 224/482 |

(Continued)

*Primary Examiner* — Joshua E Freeman
(74) *Attorney, Agent, or Firm* — Hulsey, P.C.

(57) ABSTRACT

A multi-directional locking gun mount for receiving and mounting a gun in a secure, rigid, and fixed position. A mounting based for mounts to a fixed surface of sufficient strength to rigidly support the weight of the gun. An attachment mount portion associated includes a locking rod slot and a mounting tab structure. A locking rod slidably engages the locking rod slot and permits movement along an axis parallel to the central axis of said locking rod slot between a locked position and an unlocked position. The locking rod includes at least one mounting tab accepting portion for receiving the gun when the locking rod is in an unlocked position. A mounting tab engages the gun at a predetermined location on the gun suitable for bearing the gun weight for mounting the gun in a fixed position. The mounting tab locks to said attachment mount by positioning said locking rod to said locked position, thereby locking the gun to the multi-directional locking mount to the fixed surface.

20 Claims, 5 Drawing Sheets

(56) References Cited

U.S. PATENT DOCUMENTS

| | | | | |
|---|---|---|---|---|
| 8,939,335 | B2* | 1/2015 | Setina | B60R 5/04 |
| | | | | 224/281 |
| 9,733,036 | B2* | 8/2017 | Tucker | F41A 23/18 |
| 9,885,534 | B2* | 2/2018 | Boggess | F41A 23/18 |
| 2002/0088831 | A1* | 7/2002 | Morford | B60R 7/14 |
| | | | | 224/311 |
| 2004/0237372 | A1* | 12/2004 | Frye | F41A 23/16 |
| | | | | 42/94 |
| 2007/0084338 | A1* | 4/2007 | Schwarzenberg | F41A 23/34 |
| | | | | 89/37.03 |
| 2009/0159540 | A1* | 6/2009 | Meeks | B60R 7/14 |
| | | | | 211/64 |
| 2009/0223106 | A1* | 9/2009 | Marlatt | F41A 23/02 |
| | | | | 42/94 |
| 2011/0290837 | A1* | 12/2011 | Smith | B60R 7/14 |
| | | | | 224/413 |
| 2012/0246900 | A1* | 10/2012 | Shimmel | F41A 23/26 |
| | | | | 29/407.08 |
| 2013/0269509 | A1* | 10/2013 | Irwin | F41A 23/005 |
| | | | | 89/37.01 |
| 2014/0263107 | A1* | 9/2014 | Arabian | B60R 7/14 |
| | | | | 211/8 |
| 2016/0084603 | A1* | 3/2016 | Michal | F41A 23/26 |
| | | | | 42/94 |
| 2017/0115087 | A1* | 4/2017 | Di Carlo | F41A 23/26 |

* cited by examiner

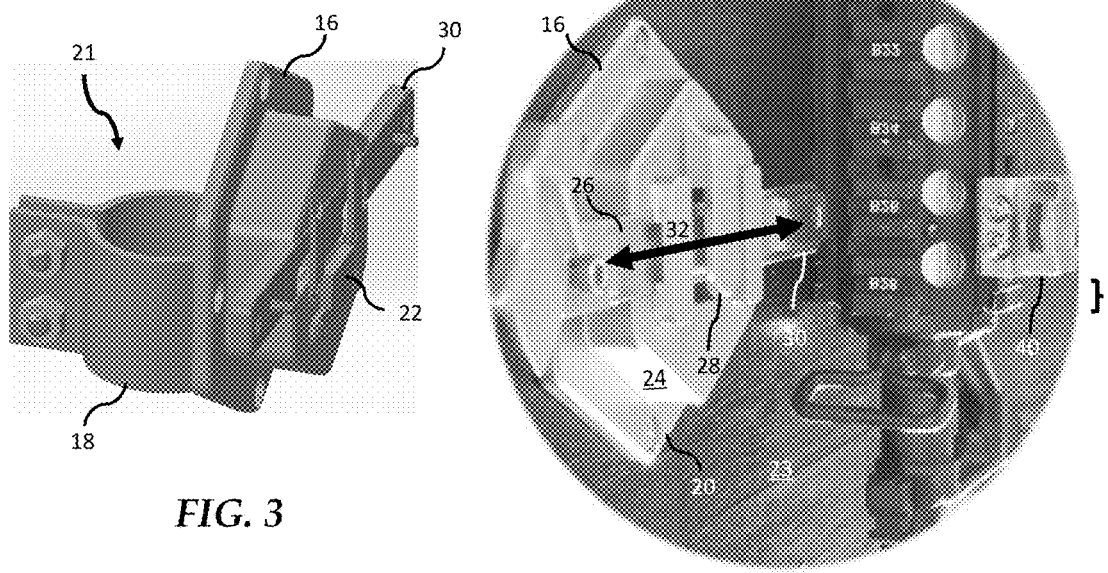
FIG. 3
FIG. 4
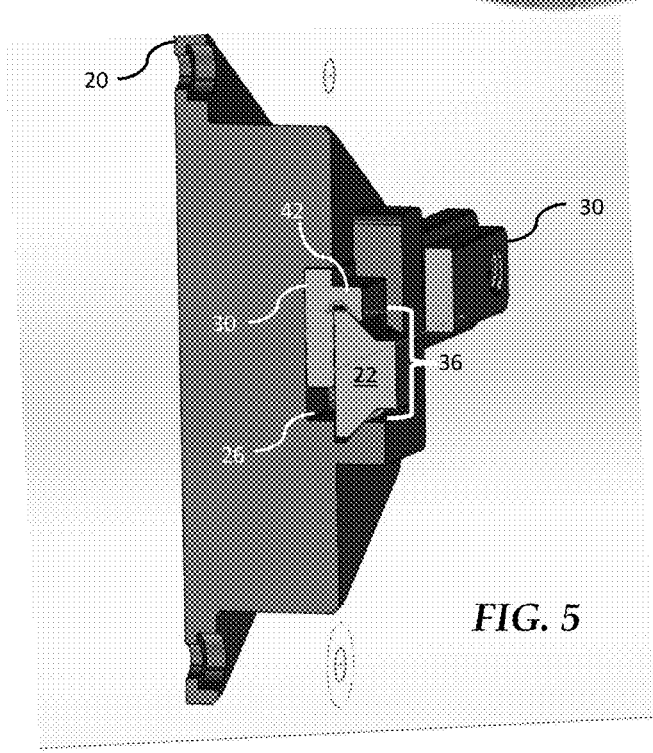
FIG. 5

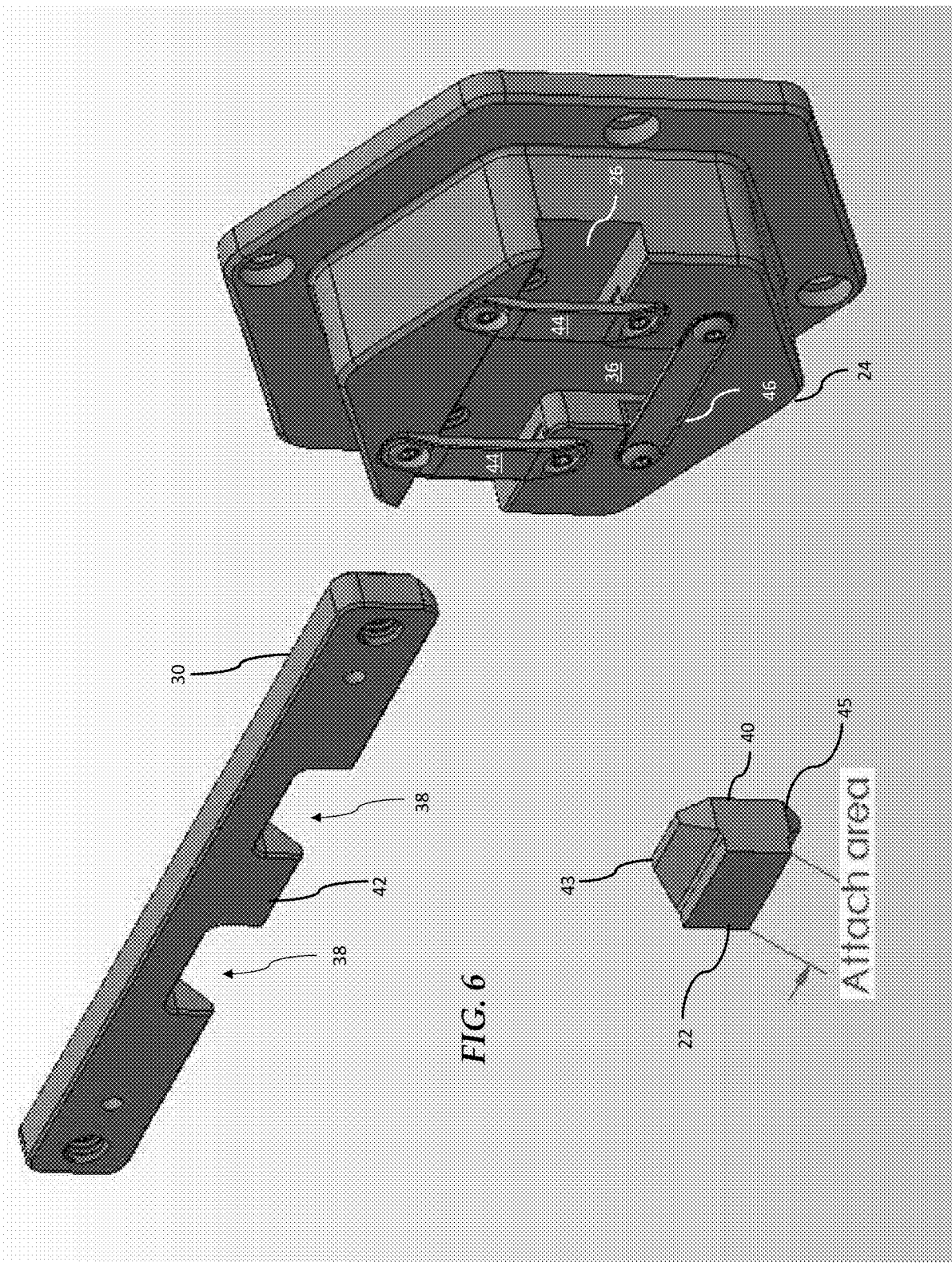

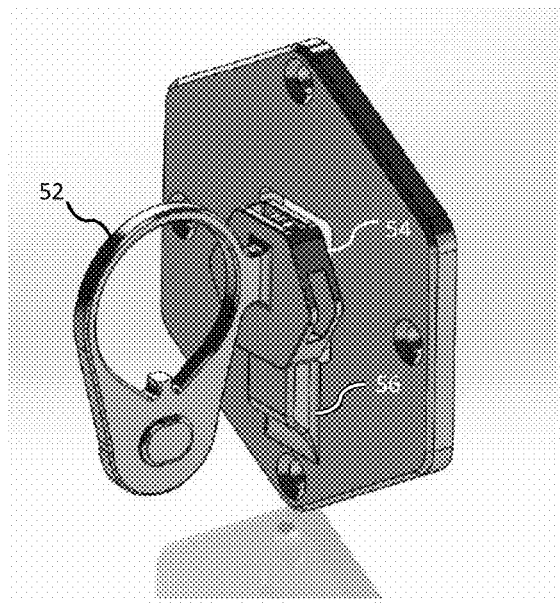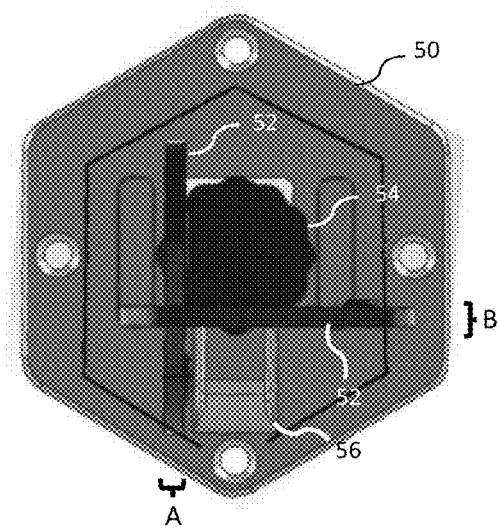
*FIG. 7*  *FIG. 8*
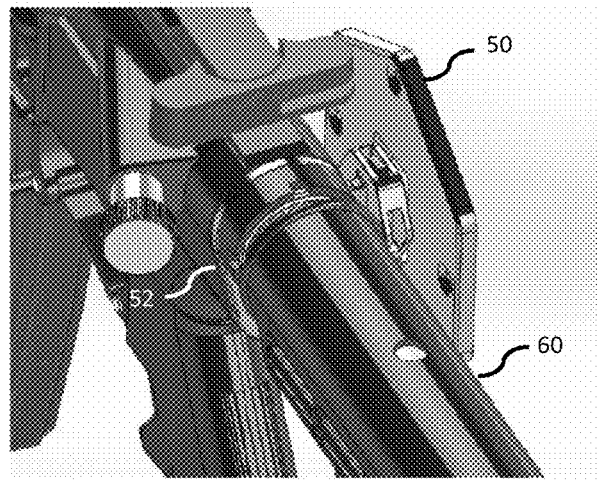
*FIG. 9*

MULTI-DIRECTIONAL LOCKING GUN MOUNT AND METHODS OF USE FOR A VARIETY OF APPLICATIONS

FIELD OF THE INVENTION

The present disclosure relates to a multi-directional locking gun mount and methods of use for a variety of applications and, more particularly to a method and system for receiving and mounting a gun in a secure, rigid, and fixed position, whereby the gun can be mounted vertically, pointed downward or upward, as well as horizontally using a significantly smaller and stronger structure than hereto available.

BACKGROUND OF THE INVENTION

Because guns are expensive, and potentially harmful when in the wrong hands, many mechanisms have been proposed over the years for securing guns or otherwise limiting unauthorized access thereto. Many of these mechanisms, e.g., gun safes and electronic gun safety systems, are unwieldy and/or expensive. Simpler alternatives are effective for their intended purpose, but do not prevent the gun from being stolen or loaded with ammunition.

Hunting from all-terrain vehicles (ATV) and other recreational vehicles has grown in popularity over the last several years. A major concern for ATV hunters is where to store their hunting rifles. Therefore, what is needed is a new gun mount which will allow for easy accessibility for a ATV hunter while still protecting the gun and/or scope from damage. In these respects, the vehicle fixable gun mount would need to substantially depart from the conventional concepts and designs of the prior art, and in so doing provide an apparatus primarily developed for the safe transportation of guns and equipment.

Law enforcement personnel also often carry guns in their vehicles. These weapons, which include shot guns, rifles, assault rifles and other types of long guns, are often stored in a gun lock fastened securely to a gun rack. The gun rack is mounted either horizontally or vertically at an interior location in the vehicle, and generally is mounted in substantially parallel to a planar region serving as the mounting base in the vehicle, such as the floor, a sidewall or the ceiling.

The design of a proper gun rack or mount for both ATV and law enforcement use should provide for immediate release of the weapon when needed. Yet, easy access to the weapon can present a problem, for example, if an intruder or other unauthorized person attempted to misappropriate the weapon.

The choice of location at which the weapon is stored in the vehicle varies considerably depending on the type of weapon selected and the geometry of the vehicle. Further complicating the problem is the fact that whereas in the past, gun mounts have generally applied to one type of weapon, today, a gun mount should accommodate a variety of weapons having considerably differing sizes and configurations.

Storage of such weapons in the home also presents problems. The weapon must be secure but readily available when needed. It is desirable for both individuals and organizations to maintain and store guns under some form of locking mechanism to provide security against unauthorized use or theft of the guns. It is particularly desirable that guns stored in the home should not be accessible to an intruder lest they be turned against the homeowner.

The present invention generally concerns mechanisms for the storage of guns, and more specifically relates to a rack apparatus designed to be mounted to a wall or similar object to securely retain and prevent unauthorized removal of one or more guns secured in the apparatus.

One method of attaching one style of guns, the AR15, horizontally on the wall involves an extended mag attachment that the gun slips into the gun through the magwell. The AR15 attaches to a wall at a single attachment point in the downward vertical direction can only be mounted around a one-inch wide area on the buffer tube and is released via a button. To release the gun, the user must hold the gun and use another hand to hit the button so that the gun does not drop when released.

Another method is a system by Peg lock that uses a strap mounting system attached to a mounted peg board. This system is marketed for applications in a vehicle in areas such as under the rear seat, on the ceiling, and on the inside of the tailgate. The user must mount a peg board, and then attach pegs to the board to support the rifle, and then attach a strap to the peg board that secures the rifle in place. Such a gun mount may be thought of as being based off the concept of handcuff.

Yet another known device provides a universal locking clamp attachment around the entire forearm of the rifle. However, what is needed is the ability to mount an accessory feature using the various rail systems already on a firearm to mate with a locking mount. Yet, there is the need for a single assembly that may attach directly into any surface for holding a rifle's weight without the further need for a bar to attach the clamp in line with the stock holder.

Another known device closes around a section of the forearm of a rifle and has a place for the stock to rest. This mount is adjustable along an attaching bar where it is to be fixed. Unfortunately, due to the clamp size, such a gun mount is not universal in accepting firearms with bulky forearms or with extra accessories. These kinds of gun mounts are devices that mount an accessory on the gun for use while operating the firearm and not to mount the gun to a fixed surface. Still other devices mount a gun using a method of two hooks or "u-shaped" figures to rest the gun in a saddle like way horizontally where my invention the gun does not rest in the mounting apparatus by two points of attachment and it can be positioned in multiple directions than horizontally.

For a new type of gun mount to be beneficial, concerns include that the gun mount be (i) economical of construction, (ii) strong and secure in the protection of guns, (iii) easily and readily accessible, (iv) artistic and aesthetic to display held guns, (iv) variably configured upon installation to hold varying numbers of guns of various sizes, and (v) versatile to hold both long guns and handguns at the same time.

SUMMARY OF THE INVENTION

The disclosed subject matter provides a multi-directional locking gun mount and methods of use for a variety of applications, additionally the present disclosure provides a method and system for receiving and mounting a gun in a secure, rigid, and fixed position, whereby the gun can be mounted vertically, pointed downward or upward, and in one direction horizontally using a significantly smaller and stronger structure than hereto available.

The present disclosure provides a method, apparatus and system for providing a multi-directional locking gun mount for receiving and mounting a gun in a secure, rigid, and fixed position. The disclosure includes a mounting based for mounting the multi-directional locking gun mount to a fixed surface of sufficient strength to rigidly support the weight of the gun. An attachment mount portion of the gun mount associates with the mounting base and comprising a locking rod slot and a mounting tab structure. A locking rod slidably engages the locking rod slot and permits movement along an axis parallel to the central axis of the locking rod slot between a locked position and an unlocked position. The locking rod includes at least one mounting tab accepting portion for receiving the gun when the locking rod is in an unlocked position and at least one mounting tab locking portion for locking the gun to the attachment mount portion upon the locking rod positioned to the locked position.

A retaining structure retains the locking rod at the locking rod slot as the locking rod moves along the axis parallel to the central axis. A mounting tab fixedly engages the gun at a predetermined location on the gun suitable for bearing the gun weight and mounting the gun in a fixed position. The mounting tab being sized to both be received by the mounting tab accepting portion and locked by the mounting tab locking portion.

An engagement structure for engages the mounting tab. The mounting tab engages the engagement structure at the mounting tab accepting portion when the locking rod is in the unlocked position. The mounting tab locks to the attachment mount by positioning the locking rod to the locked position. This results in locking the gun to the multi-directional locking mount, and thereby, to the fixed surface.

In one embodiment of the disclosure, the multi-directional locking gun mount engagement structure includes a locking shaft and the mounting tab includes a locking shaft slot for receiving the locking shaft to engage the gun with the attachment mount portion at a position that locks the gun to the multi-directional locking mount upon positioning the locking rod to the locked position.

In another embodiment of the disclosure, the multi-directional locking gun mount engagement structure includes a locking slot and the mounting tab includes a locking protrusion for inserting into the locking slot for engaging the gun with the attachment mount portion at a position for locking the gun to the multi-directional locking mount upon positioning the locking rod to the locked position.

The present disclosure further may include a frame tubing bracket for mounting said multi-directional locking gun mount to frame tubing.

The multi-directional locking gun mount may be formed so that the mounting base and the attachment mount portion are a monolithic structure, even a monolithic hexagon mounting structure.

In another aspect of the present disclosure, the multi-directional locking gun mount may include an engagement lever for inserting into said locking rod for holding said locking rod in said locked position.

In summary, the present disclosure eliminates or substantially reduces the problem of mounting a gun on a wall or at any height above the ground using two attachment points via two pegs or hooks in the horizontal or vertical position.

According to present teaching avoids the problem of mounting a gun to a surface in a vehicle or any surface that might be moved quickly such as behind a door and not remain in place securely by pegs or hooks.

BRIEF DESCRIPTION OF THE DRAWINGS

The present subject matter will now be described in detail with reference to the drawings, which are provided as illustrative examples of the subject matter so as to enable those skilled in the art to practice the subject matter. Notably, the FIGUREs and examples are not meant to limit the scope of the present subject matter to a single embodiment, but other embodiments are possible by way of interchange of some or all of the described or illustrated elements and, further, wherein:

FIG. 3 exhibits an assembly including the multi-directional locking gun mount of the present disclosure together with a frame tubing mount bracket;

FIG. 4 presents the mounting tab and mount structure according to one aspect of the present disclosure;

FIG. 5 presents a side perspective of the gun mount of the present disclosure to show an engagement of the mounting tab with the locking rod of one embodiment;

FIG. 6 provides an exploded view of the gun mount of the present disclosure to illustrate the attachment and launching elements;

FIG. 7 depicts an isometric view of a stabilizing mount according to the teachings of the present disclosure;

FIG. 8 displays alternative orientations of the stabilizing mount of the present disclosure according to the desired vertical or horizontal positioning of the gun;

FIG. 9 shows the gun barrel engaging the stabilizing mount of the present disclosure.

DETAILED DESCRIPTION OF ILLUSTRATIVE EMBODIMENTS

The detailed description set forth below in connection with the appended drawings is intended as a description of exemplary embodiments in which the presently disclosed process can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form in order to avoid obscuring the concepts of the presently disclosed method and system.

In the present specification, an embodiment showing a singular component should not be considered limiting. Rather, the subject matter preferably encompasses other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present subject matter encompasses present and future known equivalents to the known components referred to herein by way of illustration.

Figure 1:
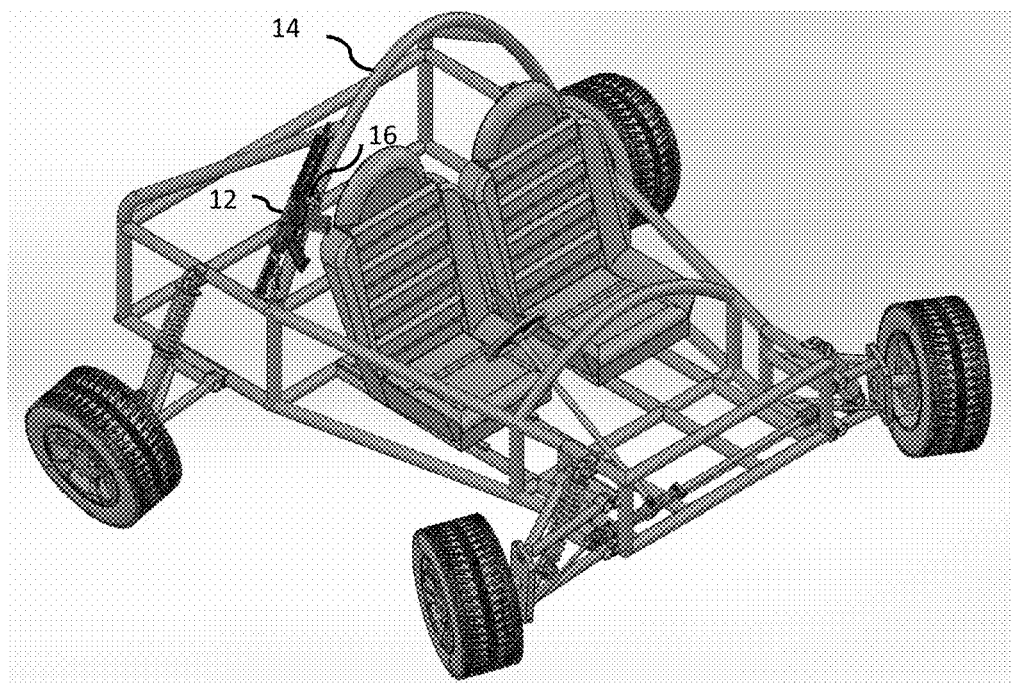
FIGS. 1 and 2 show attachment of the multi-directional locking gun mount of the present disclosure to the frame tubing of a recreational vehicle, such as a go-cart.

FIG. 1 shows attachment of the multi-directional locking gun mount of the present disclosure affixed to the frame tubing of a recreational vehicle, such as a go-cart. FIG. 1 shows, for example, an extreme sports vehicle 10 on which appears gun 12 secured to wire tubing frame 14. Multi-directional locking gun mount 16 of the present disclosure, in addition to being highly versatile, has particularly beneficial use on an extreme vehicle such as vehicle 10. Note, however, that the illustrative example of FIG. 1 is but one of many uses applicable to multi-directional locking gun mount 16 of the present disclosure. For example, uses in law enforcement vehicles, hunting vehicles, watercraft (including high speed boats), and even stationary uses such as a wall mount or similar use are applicable to the present disclosure. Accordingly, the use or description of use as herein provided is in no way intended to be limiting. Moreover, although a rifle appears in FIG. 1, the teachings and novel subject matter of multi-directional locking gun mount 16 and other aspects of the present disclosure may apply to a wide variety of guns, pistols, or other firearms and weapons.

Figure 2:
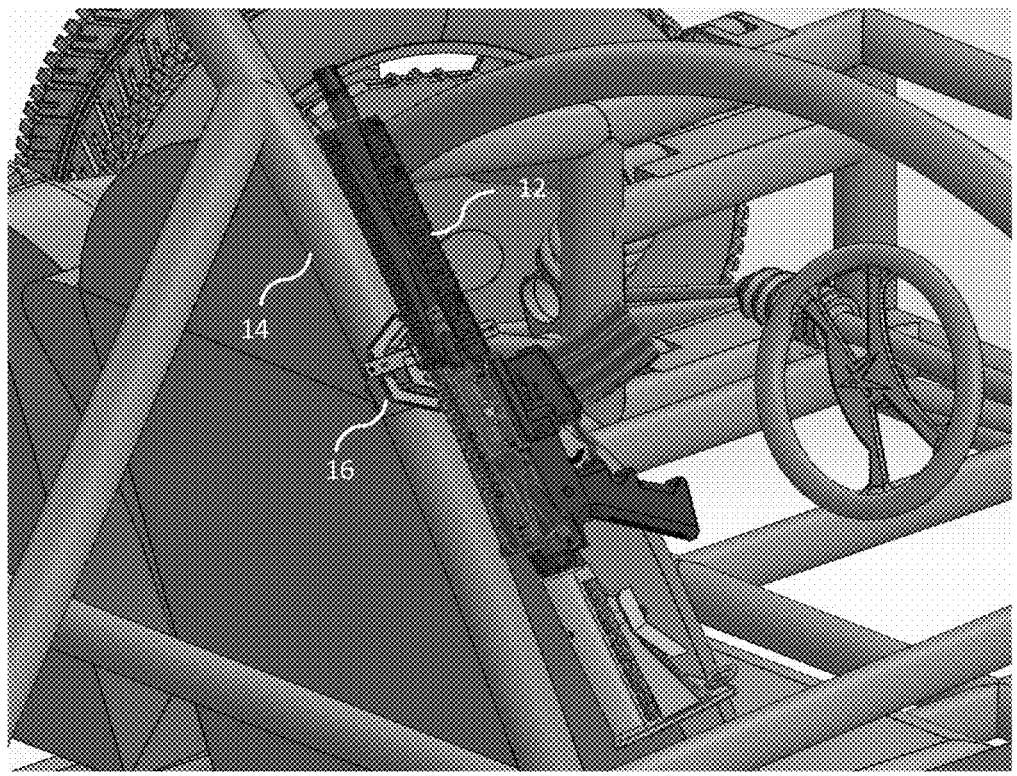

FIG. 2 depicts a more detailed review of the gun mount of the present disclosure as a gun may be mounted to the recreational vehicle frame tubing. FIG. 2 illustrates how to multi-directional locking gun mount 16 securely holds gun 12 to vehicle 10 frame tubing 14. Here, mounting bracket 18 holds multi-directional locking gun mount 16 firmly in place on frame tubing 14. FIG. 3 exhibits assembly 21 including multi-directional locking gun mount 16 together with a frame tubing mounting bracket 18. Frame tubing mounting bracket 18 may wraps around frame tubing 14 at a variety of potential locations and securely affixes multi-directional locking mount 16 to vehicle 10.

FIG. 4 presents mounting tab 22 and multi-directional locking gun mount 16 of the present disclosure. Multi-directional locking gun mount 16 is preferably of a hexagonal shape that is designed to receive and mount gun 12 in a secure, rigid, and fixed position. Multi-directional locking gun mount 16 includes a mounting base 20 for mounting to a fixed surface 23 of sufficient strength to rigidly support the weight of the gun 12. An attachment mount portion 24 associates with mounting base 20 and includes locking rod slot 26 and mounting tab structure 28. Locking rod 30 slidably engages within locking rod slot 26 for moving along an axis parallel to central axis 32 of locking rod slot 26.

Lever 34 may engage with locking rod 30 to permit or prevent release locking rod 30 for sliding within locking rod slot 26. Lever 34 may be positioned on the side of mounting base 24 when the gun is mounted upward or downward. When the gun is mounted horizontally, lever 34 preferably is positioned over the top or in the top corner of mounting plate.

The present disclosure addresses the problem of mounting gun 12 on a wall or at any height above the ground using two attachment points via two pegs or hooks in the horizontal or vertical position. The present subject matter further addresses the problem of mounting gun 12 to a surface in a vehicle or any surface that might be moved quickly such as behind a door, so that gun 12 remains in place. The present disclosure provides a superior solution to that of securing a gun with straps that may loosening or may not easily detach the gun with one hand. Multi-directional locking gun mount 16 of the present disclosure may be mounted vertically, pointed downward or upward, and in one direction horizontally. Multi-directional locking gun mount 16 securely attaches to a surface to prevent movement whether that is behind a door moving from opening and closing or in a vehicle such as for military or law enforcement use.

To remove gun 12 from multi-directional locking gun mount 16, the user will need to simply slide locking rod 30 with one hand and pull gun 12 outward/away from mounting base 20. Future plans to move locking rod 30 for dismounting gun 12 may include use of a 12 v electronic switch in a vehicle, as such for law enforcement, or electronically by a RFID reader and solenoids. A wide variety of electrical or electronic (wired and wireless) devices may be employed for providing the motive force to reposition locking rod 30 and, thereby, release gun 12.

FIG. 5 presents a side perspective of multi-directional locking gun mount 16 to show an engagement of mounting tab 22 with locking rod 30. FIG. 5 shows that when mounting tab 22 is positioned within mounting tab slot 36 and locking rod 30 is moved so that mounting tab locking portion 42 engages mounting tab 22, mounting tab 22 is held within locking rod slot 26. Because mounting tab 22 will be affixed to gun 12, the result will be that gun 12 is fixed and locked within multi-directional gun mount 16. Thus, when mounting tab 22 engages the engagement structure—either mounting tab structure 28 of FIG. 4 or mounting tab slot 36 of FIG. 5—locking rod 30 may be positioned from an unlocked position to a locked position.

A particularly attractive aspect of the presently disclosed multi-directional locking gun mount 16 is mounting tab 22 fits easily into engagement slot 36—a fit is easy and quick. Yet more importantly, when removing gun 12 from multi-directional locking gun mount 16 a simple movement of locking rod 30 permits removing mounting tab 22 from engagement slot 36 for ready use.

For engaging mounting tab 22, multi-directional locking gun mount 16 includes at least one engagement structure. FIG. 4 shows the engagement structure as mounting tab structure 28. Alternatively, FIG. 5 shows the engagement structure to be alternative mounting slot 36 for receiving mounting tab 22, with retaining structure 46 holding part of mounting tab 22 within mounting tag slot 36.

FIG. 6 provides an exploded view of multi-directional locking gun mount 16. Referring to FIG. 6, locking rod 30 slides along locking rod slot 26 between a locked position and an unlocked position. Locking rod 30 includes at least one mounting tab accepting portion 38 (here showing two) for receiving mounting tab 22 when locking rod 30 is in an unlocked position, and at least one mounting tab locking portion 42 for locking mounting tab 22 to attachment mount portion 24 upon locking rod 30 being positioned to the locked position. As FIG. 5 further shows, at least one retaining structure 44 retains locking rod 30 in locking rod slot 26, as locking rod 30 moves along said axis 32.

Locking rod 30 may include screw holes for the receipt of knobs or screws that would promote movement of the locking ride in the locking ride channel. In addition, locking rod 30 includes dimples on its backside that provide a registration or position indication as locking rod moves from side to side in the locking rod slot 26. This will help to keep locking rod 30 in a desired position for both engaging and disengaging mounting tab 22.

Mounting tab 22 may be welded or bolted to gun 12 at a location on gun 12 that is suitable for balancing and bearing the gun 12 weight in mounting gun 12 in a fixed position. Mounting tab 22 is preferably sized to both be received by mounting tab accepting portion 38 of locking rod 30 and be locked by said mounting tab locking portion 42 as locking rod slides in locking rod slot 26.

Mounting tab 22 is preferably approximately 1-inch wide and ½-inch thick. The mounting tabs fits within the engagement slot 36 as a cleat would engage to establish a firm and secure position within engagement slot 36. Once in the engagement site, locking rod 30 may move so that locking portion 42 locks the mounting tab 22 into engagement slot 36.

The multi-directional locking gun mount of the present disclosure works by a two-part mounting hook and double slotted hexagon system. A machined steel hexagon with perpendicular slots machined in the center perfectly mate near perfectly with a mounting plate that has an offset machined steel hook. To remove or detach the gun from the wall, the user can lift up the gun with one hand approximately ¾ of an inch and the slot will be off the hook to lock the device the user inserts the sliding locking rod through the back of the inserted hexagon crossing behind the mounting tab. This sliding locking rod can also be engaged by a hand activated lever or a motor driven actuator FIGS. 7 through 9 illustrate further aspects of multi-directional locking gun mount 16 of the present disclosure. Referring to FIG. 7, there appears an isometric view of a stabilizing mount 50 according to the teachings of the present disclosure. FIG. 7 shows stabilizing mount 50, which may have a hexagonal shape, similar to that of multi-directional locking gun mount 16. Stabilizing mount 50 receives an end of gun 12 at a position a laterally distanced from mounting tab 22 for fixedly engaging gun 12 at laterally distanced position that stabilizes gun 12 in the locked position on the multi-dimensional locking gun mount 16. Stabilizing mount 50 further includes slidable base 54. Slidable base 54 attaches firmly and slidably to guide 56 for adjusting the vertical and horizontal orientation of barrel harness 58, according to the vertical or horizontal orientation of stabilizing mount 50.

FIG. 8 displays alternative orientations for stabilizing mount 50 of the present disclosure according to the desired positioning of gun 12. Thus, with barrel guide 52 in orientation A, gun 12 would be in a position perpendicular to guide 56. Instead, with barrel guide 52 in orientation B, gun 12 would be parallel to guide 56.

FIG. 9 shows barrel 60 engaging barrel guide 52 of stabilizing mount 50 according to the present disclosure. Thus, in cooperation with multi-directional locking mount 16, stabilizing mount 50 provides a secure and firmly fixed structure for mounting gun 12. Moreover, because multi-directional locking mount 16 only locks at mounting base 16, upon sliding locking rod 30 to the unlocked position, gun 12 quickly and easily separates from stabilizing mount 50. Thus, as gun 12 may be secured in multi-directional locking gun mount 16 with only one hand, the simple attachment of stabilizing mount 50 yet permits this to be the case. That is, gun 12 may be removed from the coordinated mounting by both multi-directional locking mount 16 and stabilizing mount 50 with one hand.

Figure 10:
FIGS. 10 and 11 depict perspectives of the coordinated use of the multi-directional locking gun mount of the present disclosure with an associated stabilizing mount.
Figure 11:
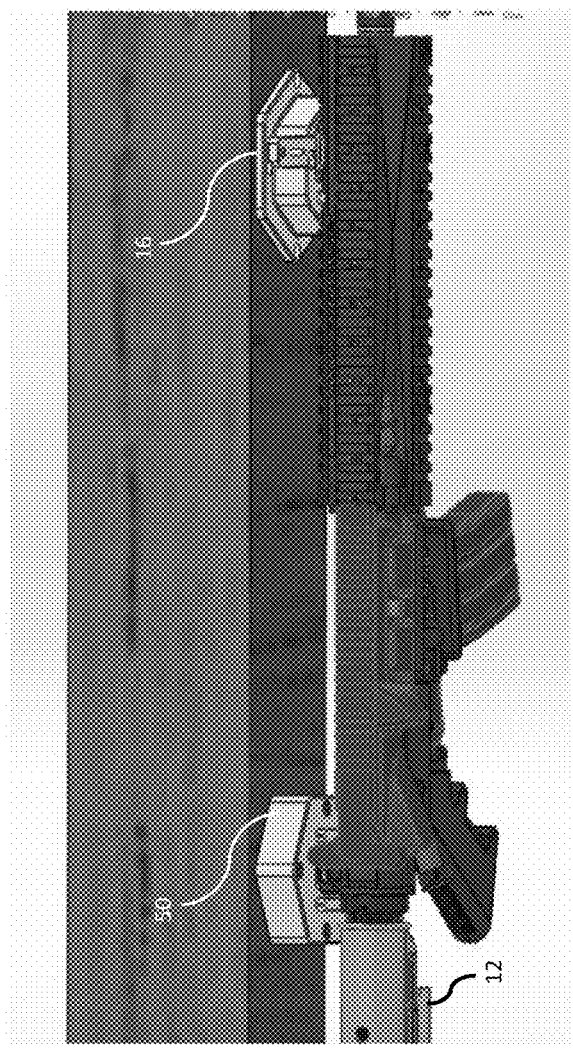

FIGS. 10 and 11, accordingly, depict perspectives of the coordinated use of the multi-directional locking gun mount 16 of the present disclosure with associated stabilizing mount 50. Multi-directional locking gun mount 16 may attach to wall 70 with barrel 60, including mounting tab 22 engaged with either mounting tab structure 28 of FIG. 4, alternative mounting tab slot 36 of FIG. 5, or a similarly functioning structure. Also, stabilizing mount 50 may engage opposite end of gun 12.

The presently disclosed multi-directional locking gun mount 16 may also be machined as an aftermarket integrated necessary component compatible with a multitude of gun systems, to provide an essentially universal mounting system. In a preferred embodiment, the mounting plate is much smaller than a 2-ft. piece of peg board for the gun to attach to. The multi-directional locking gun mount of the present disclosure may be machined out of stainless steel to be much stronger and secure. The multi-directional locking gun mount 16 of the present disclosure may also attach through the secondary mounting component. So, where previous methods attach directly to the gun, resulting in a wearing down of the contact surface and the strap kit through peg lock contacts the whole side of the gun to the surface of the peg board, the multi-directional locking gun mount 16 does not. The user of multi-directional locking gun mount 16 choose different lengths of offset mounting plates in which the gun will be spaced a set distance off the mounting surface as to allow clearance for access and preserving the surface of the gun from wear.

Multi directional locking gun mount 16 and stabilizing mount 50, as well as mountain tab 22 and stabilizing bracket 52 may all be formed a stainless steel. However, other metals or composite materials may be used to calling to the ticket or application since relevant. For the price of disclosure, stainless steel provides an idea material. There may be, however, other materials that can satisfy the weight and strength requirements for various applications of the present disclosure. Moreover, a dicronite or melonite coating may be applied to the stainless steel for providing durability and ease of handling. A dicronite or melonite coating provides both hardness as well as dry lubrication that facilitates the interaction between the metal components of the gun 12 and multi-directional locking gun mount 16.

In forming the multi-directional locking gun mount 16, one may machine a mounting surface with an extending tab outward with two sides separate of the tab on each sided with 1 inch of clearance between the two sides. Next is to machine out of stainless steel a 1-inch wide hexagon 1.5 cm thick with two slots running horizontally and vertically. Lastly, the sliding locking rod 30 will be made to the correct length to fit in between the hexagon and the two sides of the tab in order for the hexagon to be locked when seated.

The detailed description set forth herein in connection with the appended drawings is intended as a description of exemplary embodiments in which the presently disclosed subject matter may be practiced. The term "exemplary" used throughout this description means "serving as an example, instance, or illustration," and should not necessarily be construed as preferred or advantageous over other embodiments.

This detailed description of illustrative embodiments includes specific details for providing a thorough understanding of the presently disclosed subject matter. However, it will be apparent to those skilled in the art that the presently disclosed subject matter may be practiced without these specific details. In some instances, well-known structures and devices are shown in block diagram form in order to avoid obscuring the concepts of the presently disclosed method and system.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein, but is to be accorded the widest scope consistent with the principles and novel features disclosed herein. It is contemplated that additional embodiments are within the spirit and true scope of the disclosed subject matter.

What is claimed is:

1. A multi-directional locking gun mount for receiving and mounting a gun in a secure, rigid, and fixed position, comprising:

a mounting based for mounting said multi-directional locking gun mount to a fixed surface of sufficient strength to rigidly support the weight of the gun;

an attachment mount portion of said gun mount associated with said mounting base and comprising a locking rod slot and a mounting tab structure;

a locking rod for slidably engaging said locking rod slot and permitting movement along an axis parallel to the central axis of said locking rod slot between a locked position and an unlocked position, said locking rod comprising at least one mounting tab accepting portion for receiving the gun when said locking rod is in an unlocked position and at least one mounting tab locking portion for locking the gun to said attachment mount portion upon said locking rod positioned to said locked position;

at least one retaining structure for retaining said locking rod at said locking rod slot as said locking rod moves along said axis parallel to said central axis;

a mounting tab for fixedly engaging the gun at a predetermined location on the gun suitable for bearing the gun weight for mounting the gun in a fixed position, said mounting tab sized to both be received by said mounting tab accepting portion and be locked by said mounting tab locking portion;

at least one engagement structure for engaging said mounting tab;

wherein upon said mounting tab engaging said at least one engagement structure and being received by said mounting tab accepting portion when said locking rod is in said unlocked position, said mounting tab locks to said attachment mount by positioning said locking rod to said locked position, thereby locking the gun to the multi-directional locking mount to the fixed surface.

2. The multi-directional locking gun mount of claim 1, wherein said at least one engagement structure comprises a locking shaft and further wherein said mounting tab comprises a locking shaft slot for receiving said locking shaft for engaging the gun with the attachment mount portion at a position for locking the gun to said multi-directional locking mount upon positioning said locking rod to said locked position.

3. The multi-directional locking gun mount of claim 1, wherein said at least one engagement structure comprises a locking slot and further wherein said mounting tab comprises a locking protrusion for inserting into said locking slot for engaging the gun with the attachment mount portion at a position for locking the gun to said multi-directional locking mount upon positioning said locking rod to said locked position.

4. The multi-directional locking gun mount of claim 1, further comprising a frame tubing bracket for mounting said multi-directional locking gun mount to frame tubing.

5. The multi-directional locking gun mount of claim 1, wherein said mounting base and said attachment mount portion form a monolithic structure.

6. The multi-directional locking gun mount of claim 1, wherein said mounting base and said attachment mount portion form a monolithic hexagon mounting structure.

7. The multi-directional locking gun mount of claim 1, further comprising an engagement lever for inserting into said locking rod for holding said locking rod in said locked position.

8. A method for receiving and mounting a gun in a secure, rigid, and fixed position on a multi-directional locking gun mount, comprising:

mounting said multi-directional locking gun mount to a fixed surface of sufficient strength to rigidly support the weight of the gun using;

associating said mounting base with an attachment mount portion comprising a locking rod slot and a mounting tab structure;

slidably engaging a locking rod with said locking rod slot and permitting movement along an axis parallel to the central axis of said locking rod slot between a locked position and an unlocked position, said locking rod comprising at least one mounting tab accepting portion for receiving the gun when said locking rod is in an unlocked position and at least one mounting tab locking portion for locking the gun to said attachment mount upon said locking rod positioned to said locked position;

retaining said locking rod at said locking rod slot as said locking rod moves along said axis parallel to said central axis using at least one retaining structure;

fixedly engaging a mounting tab to the gun at a predetermined location on the gun suitable for bearing the gun weight for mounting the gun in a fixed position, said mounting tab sized to both be received by said mounting tab accepting portion and be locked by said mounting tab locking portion;

engaging said mounting tab with at least one engagement structure;

wherein upon said mounting tab engaging said at least one engagement structure and being received by said mounting tab accepting portion when said locking rod is in said unlocked position, said mounting tab locks to said attachment mount by positioning said locking rod to said locked position, thereby locking the gun to the multi-directional locking mount to the fixed surface.

9. The method for receiving and mounting a gun in a multi-directional locking gun mount of claim 8, wherein said at least one engagement structure comprises a locking shaft and further wherein said mounting tab comprises a locking shaft slot for receiving said locking shaft for engaging the gun with the attachment mount portion at a position for locking the gun to said multi-directional locking mount upon positioning said locking rod to said locked position.

10. The method for receiving and mounting a gun in a multi-directional locking gun mount of claim 8, wherein said at least one engagement structure comprises a locking slot and further wherein said mounting tab comprises a locking protrusion for inserting into said locking slot for engaging the gun with the attachment mount portion at a position for locking the gun to said multi-directional locking mount upon positioning said locking rod to said locked position.

11. The method for receiving and mounting a gun in a multi-directional locking gun mount of claim 8, further comprising the step of mounting said multi-directional locking gun mount to frame tubing using a frame tubing bracket.

12. The method for receiving and mounting a gun in a multi-directional locking gun mount of claim 8, wherein said mounting base and said attachment mount portion form a monolithic structure.

13. The method for receiving and mounting a gun in a multi-directional locking gun mount of claim 8, wherein said mounting base and said attachment mount portion form a monolithic hexagon mounting structure.

14. The method for receiving and mounting a gun in a multi-directional locking gun mount of claim 8, further comprising the step of inserting an engagement lever into said locking rod for holding said locking rod in said locked position.

15. A multi-directional locking gun mounting system for receiving and mounting a gun in a secure, rigid, and fixed position, comprising:
a multi-directional locking gun mount, comprising:
a mounting based for mounting to a fixed surface of sufficient strength to rigidly support the weight of the gun;
an attachment mount portion of said gun mount associated with said mounting base and comprising a locking rod slot and a mounting tab structure;
a locking rod for slidably engaging said locking rod slot and permitting movement along an axis parallel to the central axis of said locking rod slot between a locked position and an unlocked position, said locking rod comprising at least one mounting tab accepting portion for receiving the gun when said locking rod is in an unlocked position and at least one mounting tab locking portion for locking the gun to said attachment mount portion upon said locking rod positioned to said locked position;
at least one retaining structure for retaining said locking rod at said locking rod slot as said locking rod moves along said axis parallel to said central axis;
a mounting tab for fixedly engaging the gun at a predetermined location on the gun suitable for bearing the gun weight for mounting the gun in a fixed position, said mounting tab sized to both be received by said mounting tab accepting portion and be locked by said mounting tab locking portion;
at least one engagement structure for engaging said mounting tab;
wherein upon said mounting tab engaging said at least one engagement structure and being received by said mounting tab accepting portion when said locking rod is in said unlocked position, said mounting tab locks to said attachment mount by positioning said locking rod to said locked position, thereby locking the gun to the multi-directional locking mount to the fixed surface; and
a stabilizing mount for receiving an end of the gun at a position a laterally distanced from said mounting tab for fixedly engaging the gun at said laterally distanced position for stabilizing the gun to the locked position on the multi-dimensional locking mount.

16. The multi-directional locking gun mount system of claim 15, wherein said at least one engagement structure comprises a locking shaft and further wherein said mounting tab comprises a locking shaft slot for receiving said locking shaft for engaging the gun with the attachment mount portion at a position for locking the gun to said multi-directional locking mount upon positioning said locking rod to said locked position.

17. The multi-directional locking gun mount system of claim 15, wherein said at least one engagement structure comprises a locking slot and further wherein said mounting tab comprises a locking protrusion for inserting into said locking slot for engaging the gun with the attachment mount portion at a position for locking the gun to said multi-directional locking mount upon positioning said locking rod to said locked position.

18. The multi-directional locking gun mount system of claim 15, further comprising a frame tubing bracket for mounting said multi-directional locking gun mount to frame tubing.

19. The multi-directional locking gun mount system of claim 15, wherein said mounting base and said attachment mount portion form a monolithic structure.

20. The multi-directional locking gun mount system of claim 15, wherein said mounting base and said attachment mount portion form a monolithic hexagon mounting structure.

* * * * *